Dec. 23, 1969    J. W. SPRAGUE ETAL    3,485,674
ELECTRICAL ENERGY STORAGE DEVICE HAVING NEGATIVE ELECTRODE OF
ANTIMONY AND A FUSED SALT ELECTROLYTE
Filed June 5, 1967
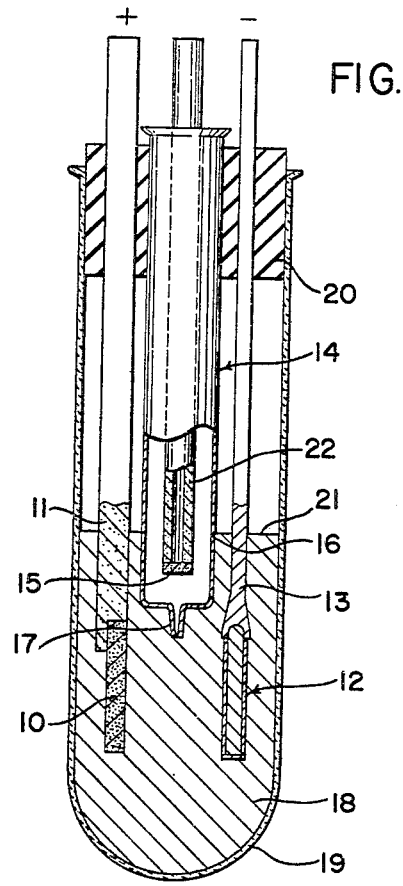
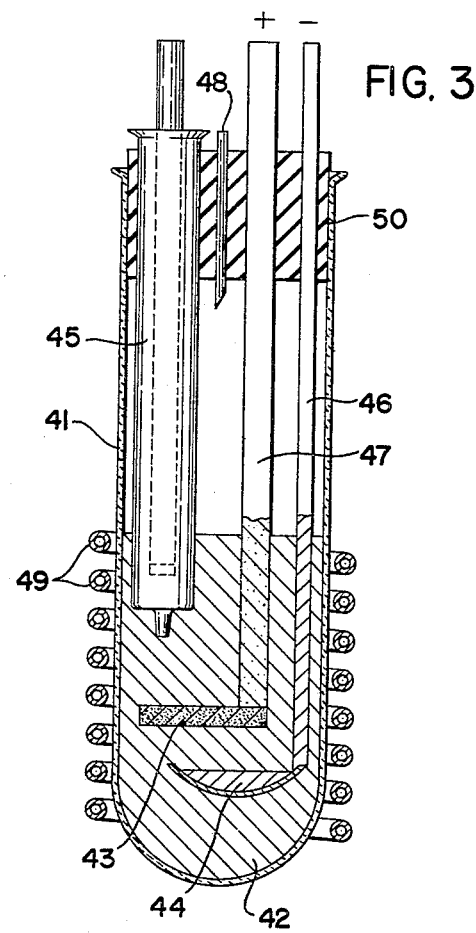
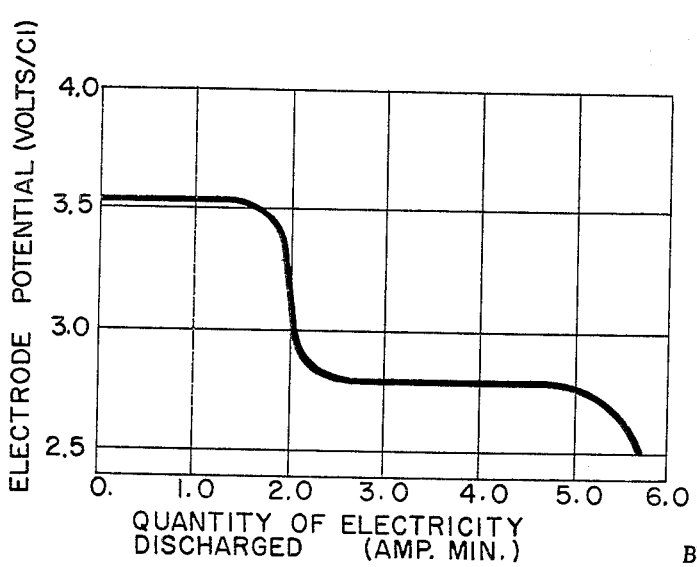
INVENTORS.
JAMES W. SPRAGUE &
EDWARD S. BUZZELLI
BY
*Leland L. Chapman*
ATTORNEY 3,485,674
ELECTRICAL ENERGY STORAGE DEVICE HAVING NEGATIVE ELECTRODE OF ANTIMONY AND A FUSED SALT ELECTROLYTE
James W. Sprague, Bedford, and Edward S. Buzzelli, Solon, Ohio, assignors to The Standard Oil Company, Cleveland, Ohio, a corporation of Ohio
Filed June 5, 1967, Ser. No. 643,519
Int. Cl. H01m 43/00, 43/06
U.S. Cl. 136—83                                    9 Claims

ABSTRACT OF THE DISCLOSURE

Electrical energy storage device utilizing negative electrode of antimony and fused salt alkali-halide electrolyte operable at a temperature at which said electrolyte is in a molten state.

---

This invention relates to negative electrodes composed of bismuth, antimony, or alloys comprising bismuth and antimony. These electrodes are useful in electrical energy storage devices utilizing molten salt electrolytes.

It has been discovered that the metals antimony and bismuth can reversibly take up and release a component of a fused salt electrolyte under the influence of an electric field in a system comprising a fused salt electrolyte, a positive electrode, and a negative electrode composed of bismuth, antimony, or an alloy comprising bismuth and antimony.

The function of a negative electrode in the energy storage device of the type referred to herein is to attract and assimilate alkali metal ions upon charging, and to release the alkali metal to the mixed salt melt upon discharging. The maximum rates at which these forward and backward processes can take place are the limiting rates of charge and discharge respectively, and the amount of alkali metal which can be assimilated by the electrode determines the amount of energy stored in the negative electrode.

The novel materials can be used as electrodes in an electrochemical system by depositing a quantity of the material in the form of chunks, powder, or any other form that it may occur, into the system, heating the electrolyte to its operating temperature, and preconditioning the material by charge and discharge cycling. The novel materials can also be supported in the form of a film on a solid porous metal substrate in order to provide a high surface to volume ratio for the material. The metal substrate can be any electronic conducting material resistant to the environment of the electrochemical device and which is wettable by the active electrode material. Examples of such substrate materials are boron carbide, nickel, stainless steel, and iron. The novel electrode may contain up to 5 percent impurities such as tin, manganese, magnesium, iron, lead, indium, etc. The impurities, however, generally comprise much less than 5 percent of the electrode.

Electrodes of the present invention, in which the active material is supported on a substrate, can be prepared in many ways, such as by the method of volatile compound deposition, whereby an oxidized compound of bismuth or antimony is heated to an elevated temperature whereupon it is reduced and deposited in a less volatile metal state on a porous substrate; by vapor deposition of the material on a substrate; by immersing a substrate into a solution of the material and subsequently driving off the solvent; and other methods.

To insure good electrode structure and full capacity, the novel electrodes require preconditioning treatment or what is otherwise known as formation cycling.

The preconditioning treatment consists of immersing an electrode in an excess of electrolyte and alternately charging the cell by means of an external current, and then discharging the charged electrode. This charge-discharge cycle is repeated several times until the proper operating characteristics are obtained. After the preconditioning treatment has provided the desired state of charge, the electrode is placed in a battery container and the remaining elements assembled.

The electrolyte preferred in the device herein described is a medium providing a source of ions and preferably alkali metal cations and anions selected from the group of nitrates, nitrites, carbonates, and halides.

Typical examples of materials which can be used as the electrolytes include salts of metals and mixtures of such salts, and preferably eutectic mixtures thereof, such as binary systems of LiCl-KCl, LiBr-KBr, LiBr-NaBr, LiBr-LiF; and ternary systems such as $CaCl_2$-LiCl-KCl, LiCl-KCl-NaCl, $CaCl_2$-LiCl-NaCl, LiF-NaF-RbF. Mixtures of alkali-nitrites, alkali-nitrates, and alkali-carbonates are also candidates. A particularly useful electrolyte is a molten salt comprising LiBr-KBr, or a molten salt comprising LiCl-KCl having a composition of about 59 mole percent lithium chloride and 41 mole percent potassium chloride. This is a eutectic which melts at about 352° C.

The carbon electrode which can be used in combination with the novel negative electrodes is porous and can be in the form of finely divided, high surface area activated carbon.

Activated carbon is prepared in a two-step process comprising formation of a porous amorphous primary carbon at a realatively low temperature, followed by the removal of adsorbed hydrocarbons from the primary carbon. Step two involves the removal of adsorbed hydrocarbons by combined oxidation and distillation involving steam alone, or steam and air. The hydrocarbons of low boiling points are thus broken down into more volatile substances easily removed at low temperatures and under conditions less likely to result in the deposition of secondary carbon, which is inactive. During the removal by oxidation and distillation of the hydrocarbons, a loss in primary carbon by oxidation occurs. The conditions of activation must therefore be chosen so that the hydrocarbons are oxidized rapidly while the primary carbons slowly.

In one method of operation of the steam-activation process, the carbon is placed in an upright steel tube with top feed and bottom discharge. Superheated steam enters and passes downward through the carbon, carrying away the undesired hydrocarbons before they can be decomposed by the high temperature and deposit inactive carbon. In air treatment, the temperature is about 350° C. to about 450° C., while in the steam oxidation process, the temperature is about 800° C. to about 1200° C.

Other electrodes may be used in place of carbon, such as electrodes comprising tungsten, tantalum, etc.

Example I

Bismuth anode was prepared by dipping a blank of nickel metal, through a layer of flux, into molten bismuth. The film of liquid bismuth which adhered to the nickel upon withdrawal was assembled in the cell shown by FIG. 1.

Referring to FIG. 1, the test cell contains three electrodes; (I) activated carbon cathode 10 with graphite lead 11, (II) test electrode 12 composed in this case of a film of liquid bismuth on solid nickel substrate with steel lead 13, and (III) chlorine reference electrode 14 constructed from a graphite tube covered with a piece of porous activated carbon frit 15. The chlorine reference electrode is shown suspended in a separate compartment 16 formed by a piece of Pyrex® tubing drawn to a capillary point 17. The capillary point was kept sufficiently open so that not over 100 ohms resistance be developed between chlorine reference electrode 14 and bismuth test electrode 12. The electrodes were immersed into LiCl-KCl electrolyte 18 contained in Pyrex® test tube 19, 32 mm. I.D. x 200 mm. Test tube 19 was provided with stopper 20 at the open end.

The LiCl-KCl electrolyte was prepared by mixing 59 mole percent lithium chloride crystals and 41 mole percent of potassium chloride crystals. This mixture was dried in an argon atmosphere at about 500° C. for two hours and then introduced into the test cell to level 21, slightly above the top of the electrodes and maintained at 500° C. Chlorine gas was fed down into the tube 22 of the reference electrode 14 and allowed to bubble through the porous activated carbon frit 15 to maintain a stable reference voltage. The evolved gas was vented through openings in the stopper 20 to the atmosphere and thus did not contaminate the cell. An argon atmosphere was maintained in test tube 19 by feeding argon through an opening in the stopper 20.

The cell was preconditioned by charging the cell to 3.30 volts open-circuit and discharging to about 0.7 volt open-circuit and back to 3.30 volts open-circuit. The preconditioning process was complete after ten cycles.

The electrodes were tested by using a constant current source to drive the cell and a switching circuit to measure the potential of the cathode and then the anode, relative to the chlorine reference electrode. From these data, the results associated with a particular potential plateau was determined for each electrode in the cell independently of the other.

The voltage of the anode thus tested was −2.95 volts with respect to the chlorine reference electrode.

A discharge curve for the electrode composed of a film of liquid bismuth metal supported on solid nickel metal is shown in FIG. 2. This figure demonstrates that the electrode can store and release electrical energy in a fused salt electrical energy storage cell. The vertical intermediate portion of the curve indicates a change in the mechanism, and the horizontal sections indicate quantity of and specific types of energy storage.

Example II

Procedure of Example I was repeated using antimony instead of bismuth. The electrolyte was maintained at 1200° F. in a Vycore® receptacle. Voltage of this anode was −2.85 volts with respect to the chlorine reference electrode.

Example III

The effectiveness of bismuth as an anode in an electrical storage cell has also been tested utilizing a pool of liquid bismuth as the anode and a carbon electrode as the cathode.

Referring to FIG. 3, Pyrex® test tube 41 held LiCl-KCl electrolyte 42 maintained at 460° C. Immersed in the electrolyte 42 were three electrodes: carbon electrode 43, bismuth electrode 44, and chlorine reference electrode 45. One gram of bismuth, constituting electrode 44, was supported by stainless steel sample holder 46, which also functioned as the current collector. Carbon electrode 43, composed of porous activated carbon and having the dimensions of 1 x 3/4 x 1/8 inches, was provided with lead 47 to transmit current externally of the cell. Test tube 41 was provided with stopper 50. Argon gas was introduced through inlet 48 in the stopper into the cell to maintain an inert atmosphere. The cell was brought up to the operating temperature by means of heating coils 49, and preconditioned.

The capacity of the cell at 100 milliamperes discharge was 0.445 amp. hour per gram of bismuth. The voltage was 2.95 volts with respect to the chlorine reference electrode.

Example IV

Effectiveness of antimony as an anode in an electrical energy storage cell has been demonstrated using one gram of antimony in the cell described in Example III. The electrolyte was maintained at 460° C.

The voltage of the cell was 2.85 volts with respect to the chlorine reference electrode; the capacity was 0.6 amp. hour per gram of antimony.

The novel electrode materials disclosed herein can be alloyed to produce a useful electrode. By alloying antimony with bismuth, the melting point of antimony could be effectively depressed.

The electric energy storage units herein described lend themselves to connection with units of similar construction, either by connection of units in series and parallel, or by utilization of a stack of electrodes.

We claim:
1. An electrical energy storage device comprising
 (a) an electrolyte, the cation thereof being selected from alkali metals, and the anion thereof selected from halides, nitrates, nitrites, and carbonates,
 (b) a positive electrode in contact with said electrolyte, and
 (c) a negative electrode also in contact with said electrolyte, said negative electrode consisting essentially of antimony,
said device being operable at a temperature at which said electrolyte is in a molten condition, and said negative electrode functioning to assimilate alkali metal ions upon charging and to release alkali metal to said electrolyte upon discharging.

2. An electrical energy storage device of claim 1 wherein said antimony is deposited on a conductive substrate.

3. An electrical energy storage device of claim 1 wherein said positive electrode comprises activated carbon.

4. An electrical energy storage device comprising
 (a) a fused salt alkali-halide electrolyte,
 (b) a positive electrode in contact with said electrolyte, and
 (c) a negative electrode consisting essentially of antimony,
said device being operable at a temperature at which said electrolyte is in a molten condition, and said negative electrode functioning to assimilate alkali metal ions upon charging and to release alkali metal to said electrolyte upon discharging.

5. An electrical energy storage device of claim 1 wherein said antimony is supported on a conductive substrate.

6. An electrical energy storage device of claim 1 wherein said electrolyte is LiCl-KCl, and said positive electrode comprises activated carbon.

7. An electrical energy storage device of claim 6 wherein said electrolyte is a eutectic mixture of LiCl-KCl.

8. An electrical energy storage device of claim 1 wherein said positive electrode comprises activated porous carbon, and said electrolyte is LiCl-KCl.

9. An electrical energy storage device in combination with
 (a) an alkali-halide electric comprising lithium-halide;
 (b) a positive porous carbon electrode,
 (c) a negative electrode consisting essentially of antimony,
 (d) a container for said electrolyte inert to said electrolyte, and
 (e) means sealing said device to prevent contact of said electrolyte and the ambient atmosphere,
said device being capable of high rates of charge and discharge when the electrolyte is maintained at a temperature at which said electrolyte is in a molten condition, and said negative electrode functioning to assimilate alkali metal ions upon charging and to release alkali metal to said electrolyte upon discharging.

References Cited

UNITED STATES PATENTS

| | | |
|---|---|---|
| 2,959,631 | 11/1960 | Boswell. |
| 3,064,222 | 11/1962 | Renier. |
| 3,160,531 | 12/1964 | Spindler. |
| 3,186,875 | 6/1965 | Freeman. |
| 3,245,836 | 4/1966 | Agruss. |
| 3,410,730 | 11/1968 | Rightmire et al. |

WINSTON A. DOUGLAS, Primary Examiner

A. SKAPARS, Assistant Examiner

U.S. Cl. X.R.

136—100